June 14, 1938.  A. KÉGRESSE  2,120,753
SILENCING DEVICE FOR ENDLESS TRACK VEHICLES
Filed Feb. 13, 1936  2 Sheets-Sheet 1
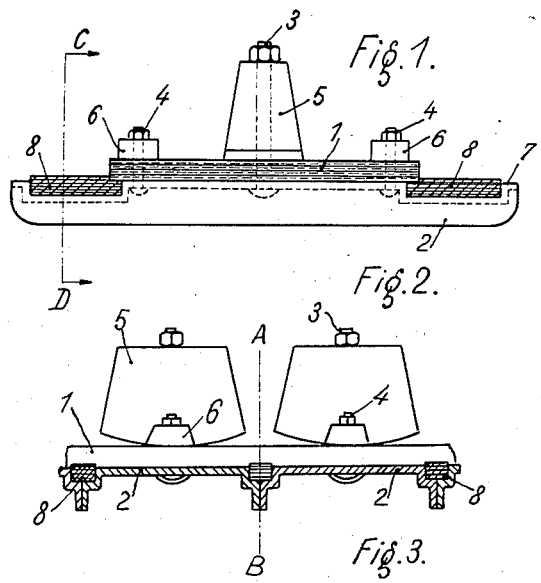
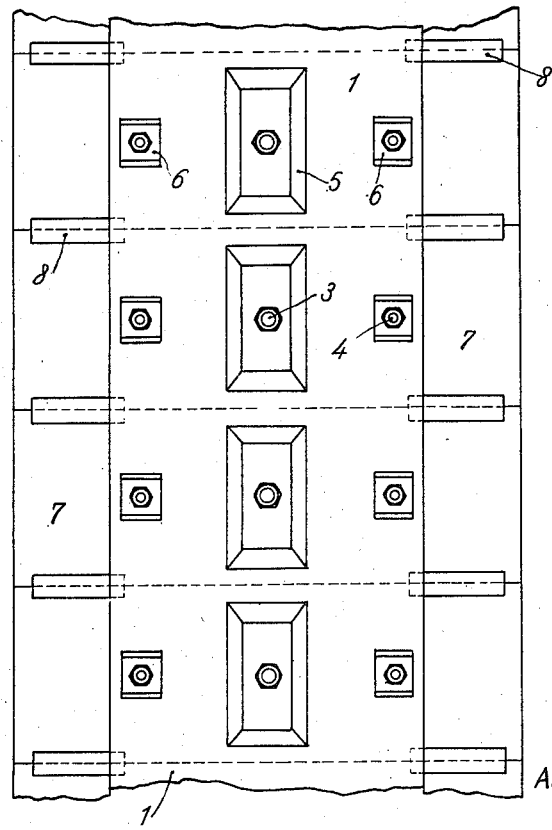
INVENTOR:
Adolphe Kégresse
BY
Emil Bönnelycke
ATTORNEY June 14, 1938. A. KÉGRESSE 2,120,753
SILENCING DEVICE FOR ENDLESS TRACK VEHICLES
Filed Feb. 13, 1936   2 Sheets-Sheet 2

INVENTOR:
Adolphe Kegresse
BY
Emil Börnelyke
ATTORNEY

Patented June 14, 1938

2,120,753

UNITED STATES PATENT OFFICE 2,120,753

SILENCING DEVICE FOR ENDLESS TRACK VEHICLES

Adolphe Kégresse, Paris, France

Application February 13, 1936, Serial No. 63,794
In France March 6, 1935

2 Claims. (Cl. 305—10)

The effort to obtain high speed for endless track vehicles in which the running of the track supporting rollers takes place on metal, leads to the use of rollers with coverings or tyres of rubber in order to prevent the noise which is created by the running of a metal roller on a metal path in sections.

In flexible endless track vehicles the metal rollers running on a belt are obviously silent, but have the defect that the metal rollers when loaded beyond a certain amount and beyond a certain speed, very rapidly deteriorate the belt particularly when the machine is working on uneven ground; mud and pieces of soil penetrate between the rollers and the belt and so into this latter and make it useless.

For this reason, the idea has for many years been tried of running the rollers alongside the endless band directly on the metal parts of the tyre. In this, to prevent noise, the rollers have been covered with rubber as with the entirely metallic endless track vehicles.

Practice has shown that this solution was satisfactory in the two types of endless track referred to at comparatively small speeds. On very rapid machines the rubber tyres of the rollers become excessively heated and are detached or are deteriorated very rapidly.

It therefore appears advisable to seek to do away with this tyre and to cause the rollers with metallic rims to run directly on the metal plates of the endless track. This is what takes place on many vehicles with metallic tracks. The introduction of this device, though simple, is restricted, as has been explained above, by the noise.

On closely studying the problem to be solved, it is found that the noise of a metal roller running on a metal path is produced principally by the passage of the roller from one metal plate on to the next one.

The present invention relates to a device which if not permitting the total suppression of this noise, at least deadens it to a large extent.

On the annexed drawings, by way of example:—

Figure 1 is a sectional view on the line A—B of Figure 2 showing the device in question applied to a flexible endless track with the roller running track on the outside;

Figure 2 is a sectional elevation on the line C—D of Figure 1;

Figure 3 is a plan view;

Figure 4:
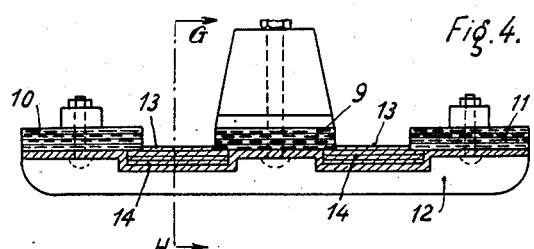
Figure 4 shows in section on the line E—F of Figure 5 the application of the device to a triple belt tyre.

In Figures 1, 2 and 3 the endless track is constituted in the known way, by a flexible belt 1 (Figures 1 to 3) fixed on metal plates 2 (Figures 1, 2) by means of bolts 3 and 4 which unite said parts with the guide blocks 5 and the driving teeth 6 (Figures 1, 2 and 3) to form an integral structure.

The supporting rollers run on the marginal part 7 (Figures 1, 3) of the metal plates 2, on each side of the belt 1. These plates are mounted so as to touch each other, and at the level of the running path of the rollers and on each side of the belt are provided with recesses in which are placed pieces of plastic material 8 (Figures 1, 2, 3).

As will be seen from the figures, each piece 8 is held in place by the belt itself under which it partially engages.

It will be easily seen that, owing to this improvement, the load supporting rollers pass from one plate to the other, squeezing to a certain extent the elastic buffer 8 which thus deadens the noise produced by the shock arising from the passage of the metal roller from one plate to the next one.

It will be easily understood that this device, which is very simple, may be applied to any kind of endless track.

Figure 5:
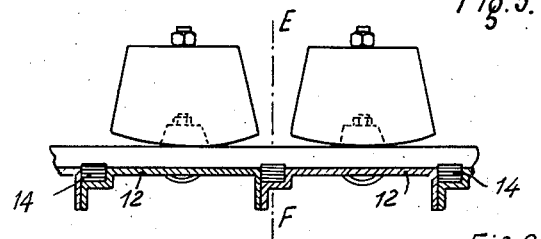
Figure 5 is an elevation of this last tyre in section on the line G—H of Figure 4.
Figure 6:
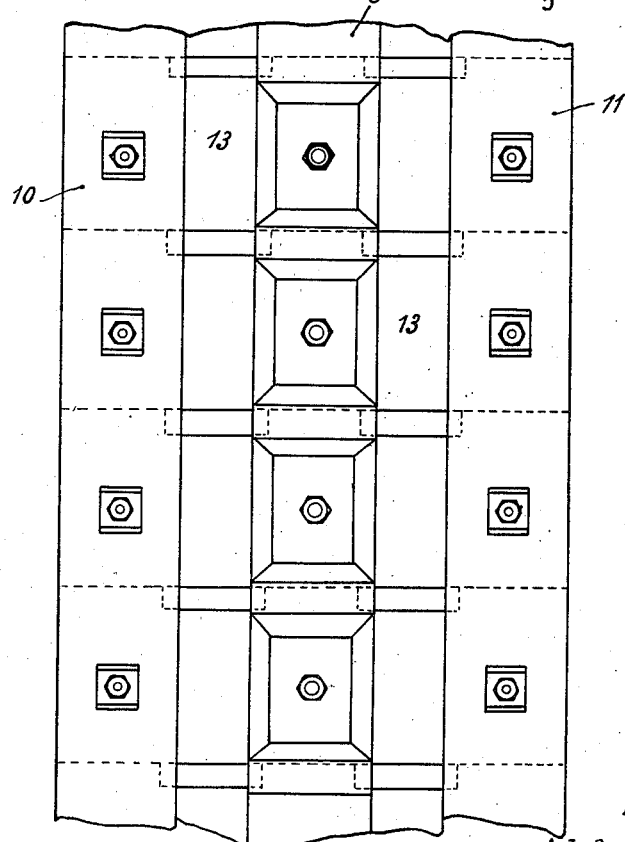
Figure 6 is a plan view.

Figures 4, 5 and 6 show an example of applying the invention to an endless track with three belts 9, 10, 11 (Figures 4, 6) also mounted on metallic plates 12 (Figures 4, 5). Here the running paths of the rollers 13 are located between the central belt 9 and the side belts 10 and 11 (Figures 4, 5, 6).

This running path, according to the type of endless track shown by Figures 1, 2, 3, contains between each metal plate 12 a piece of plastic material 14 lodged in the plates 12 and flush with the surface of the running path of the rollers.

The pieces 14 and the corresponding recess in the plates 12 are made sufficiently long for their extremities to engage under the belts 9, 10, 11 (Figure 4). In this way, the pieces 14 are held automatically in position.

Here, the recessing of the part 12 is shown on a single plate, whilst in the preceding type of endless track the piece of plastic material 8 (Figures 1, 2 and 3) extends over two adjacent plates. These two modifications attain the same object.

Instead of giving the plastic pieces 8 and 14 a rectangular section as shown on the drawings, they may be provided of half round, dovetail or other section.

I claim:

1. In an endless track vehicle with soft endless belts connected to metal tread plates and running on rollers, silencing means comprising a pair of blocks of plastic material interposed between each pair of adjacent tread plates, one of the extremities of each block engaging under an endless belt.

2. In an endless track vehicle with soft endless belts connected to metal tread plates and running on rollers, silencing means comprising a piece of plastic material interposed between each pair of adjacent tread plates, both extremities of each piece engaging under the endless belts.

ADOLPHE KÉGRESSE.